United States Patent [19]

Andringa

[11] 3,937,578
[45] Feb. 10, 1976

[54] LASER GYROSCOPE
[75] Inventor: Keimpe Andringa, Sherborn, Mass.
[73] Assignee: Raytheon Company, Lexington, Mass.
[22] Filed: Feb. 11, 1974
[21] Appl. No.: 441,086

[52] U.S. Cl. ... 356/106 LR; 331/94.5 C; 331/94.5 S
[51] Int. Cl. .......................... H01s 3/10; H01s 3/22
[58] Field of Search ............ 331/94.5; 356/106 LR; 350/113

[56] References Cited
UNITED STATES PATENTS

| | | | |
|---|---|---|---|
| 3,529,894 | 9/1970 | Hock | 356/113 |
| 3,535,040 | 10/1970 | Vigneri et al. | 356/106 LR |
| 3,596,201 | 1/1971 | Chester | 331/94.5 |

*Primary Examiner*—Robert J. Webster
*Attorney, Agent, or Firm*—Richard M. Sharkansky; Joseph D. Pannone

[57] ABSTRACT

A laser gyroscope is disclosed wherein two pairs of waves propagating in opposite directions in a laser resonator are amplified by the laser medium of such resonator. The frequencies of such waves, which are all different, are maintained symmetrically about the center maximum gain frequency curve associated with the laser medium by operation of a pathlength stabilizer. Means are provided for combining a portion of each one of the waves in at least one of the pair of waves into a single composite beam and for controlling, in accordance with the relative levels of the energy in the components of such single composite beam, the pathlength of the laser resonator. With such an arrangement only one photodetector is required for pathlength stabilization.

7 Claims, 9 Drawing Figures

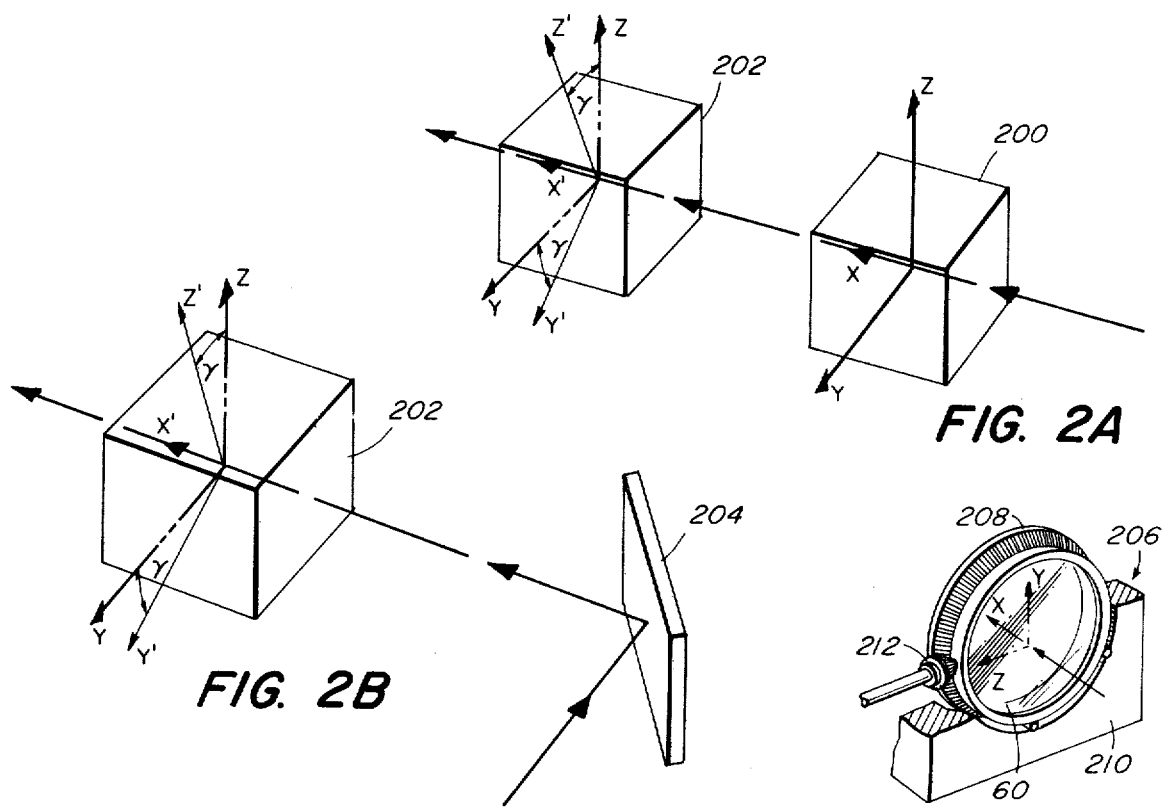
FIG. 2A
FIG. 2B
FIG. 2C
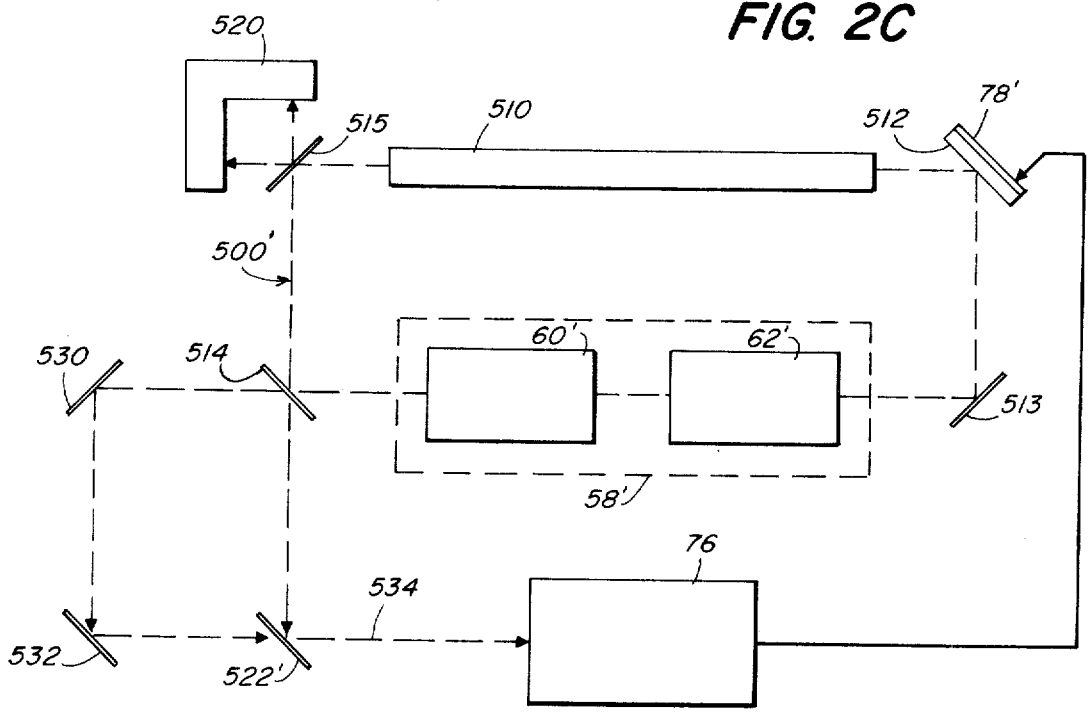
FIG. 6

LASER GYROSCOPE

BACKGROUND OF THE INVENTION

This invention relates generally to laser gyroscopes and more particularly to pathlength stabilization systems used therein.

As is described in my U.S. Pat. No. 3,741,657, assigned to the same assignee as the present invention, a ring laser having a polarization dispersive path produces four radiant energy waves, each one of such waves having a different frequency, one pair thereof traveling in a clockwise direction and the other pair thereof traveling in a counterclockwise direction. The propagation times of the waves are such that the pair of frequencies of the waves traveling in one direction, say the counterclockwise direction, is positioned between the frequencies of the waves traveling in the opposite, or clockwise, direction. Movement of the laser, for example, by rotation of the system about an axis perpendicular to the path, produces frequency shifts of the pair of waves propagating in one direction through the laser which are opposite to the frequency shifts of the waves moving in the opposite direction through the laser. This, in turn, produces changes in the frequency separation between the lower frequencies of each said pair oppositely to a change in the frequency separation between the higher frequencies of each of said pairs. The difference between such changes is, substantially, a linear function of the rate of said rotation and the relative sense of such difference is indicative of the direction of said rotation.

It is generally desirable in operation of such laser gyroscope that the lower frequency of each pair of frequencies is positioned below the maximum gain frequency. More specifically, the frequencies of each pair are maintained substantially equidistant above and below the maximum gain or center frequency of the laser. As described in my U.S. patent, referenced above, such positioning of the frequencies is accomplished by a pathlength stabilization system wherein a pair of photodetectors is included, one of such photodetectors being responsive to the waves in the lower pair of frequencies and the other one being responsive to the waves in the upper pair of frequencies. The output signals of the pair of photodetectors are filtered and passed to a differential amplifier. The differential amplifier produces a control signal proportional to the difference between the power level of the waves in the upper and lower pairs of frequencies. The control signal is then fed to a piezo-electric crystal included in the support means for one of the reflectors to change the position of such reflector thereby determining the pathlength of the laser. Hence, the pathlength of the laser is stabilized in accordance with the difference in power levels between the upper and lower pairs of frequencies to compensate for mechanical movement of portions of the system with respect to each other, thereby keeping the four frequencies positioned symmetrically about the center maximum gain curve of the laser medium.

While such pathlength stabilization system has been found adequate in many applications, any unbalance between the characteristics of the pair of photodetectors produces concomitant errors in the desired pathlength stabilization. Still further, because both clockwise and counterclockwise waves are used in pathlength stabilization and because such waves pass to the pair of photodetectors through different optical elements, errors in the desired stabilization may result from such elements.

SUMMARY OF THE INVENTION

In accordance with this invention a laser gyroscope is provided, wherein two pairs of waves propagating in opposite directions and having separate frequencies are amplified in a laser medium, such gyroscope comprising: Means for combining a portion of each one of the waves in at least one of the pairs of waves into a single composite beam; and, means, responsive to the relative levels of the energy in each one of the portions of the pairs of waves in such beam, for maintaining the separate frequencies of the amplified waves symmetrically about a center maximum gain curve associated with the laser medium.

BRIEF DESCRIPTION OF THE DRAWINGS

For a more complete understanding of this invention, reference is now made to the following description and to the drawings, in which:

FIGS. 2A and 2B are sketches useful in understanding the effect of half-wave retarders used in a polarization dispersive structure of the laser gyroscope shown in FIG. 2;

FIG. 2C is an elevational view of a means for mounting and orienting a half wave retarder useful in the invention;

FIGS. 5 and 6 are a diagram of a four reflector laser gyroscope using the pathlength stabilizer shown in FIG. 3.

DESCRIPTION OF THE PREFERRED EMBODIMENT

Figure 1:
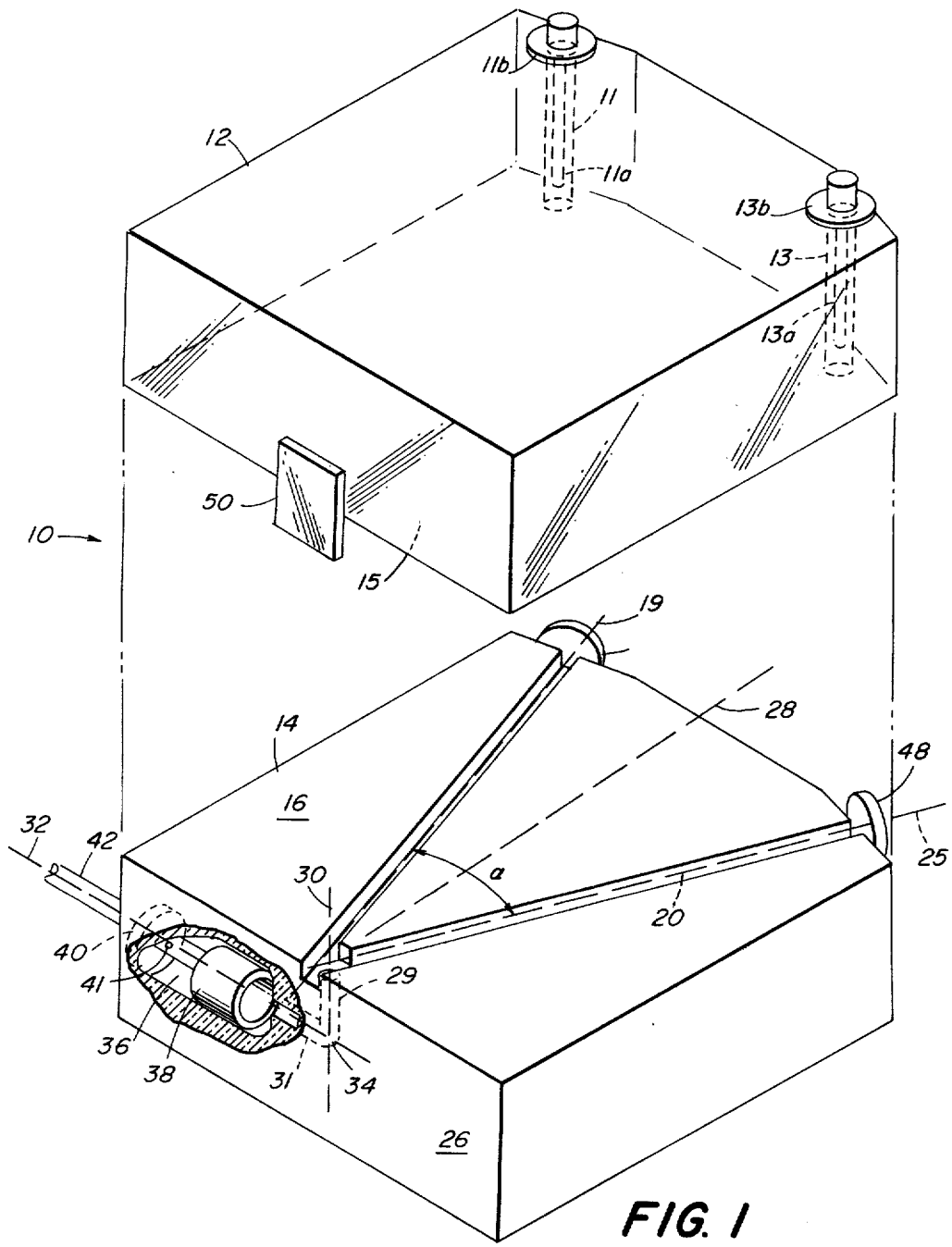
FIG. 1 is an isometric drawing, exploded, partially broken away and somewhat simplified, of a V-shaped laser discharge tube assembly useful in a laser gyroscope according to the invention.

Referring now to FIG. 1, a laser discharge tube assembly 10 is shown to include a pair of blocks 12, 14, each made of the same vitreous material such as fuzed quartz or the ceramic vitreous material manufactured by Owens-Illinois, Inc., Toledo, Ohio and known as "Cer-Vit." Block 12 is polished to provide an optically smooth surface 15. A pair of holes (not numbered) is formed transversely through such block 12. Conventional anode electrodes 11, 13 are inserted within such holes, the ends (designated by the numerals 11a, 13a respectively) being recessed slightly within block 12. The anode electrodes 11, 13 are affixed to block 12 by a suitable metal-to-glass sealing material (not shown) disposed between the flanges 11b, 13b of such electrodes and the block 12.

Block 14 is polished to provide an optically smooth surface 16. Such block is then milled, as shown, using conventional glass grinding techniques, to form a pair of grooves 18, 20, here arranged in a V-shape. The grooves 18, 20 are formed along axes 19, 25 respectively as shown and the walls of such grooves 18, 20 are polished in a conventional manner. Here such grooves 18, 20 are 50 millimeters in length, with a maximum deviation of ± 0.050 millimeter from axes 19, 25 and have rectangular cross-sectional areas of 1 square millimeter. The axes 19, 25 of such grooves 18, 20 intersect in the plane of surface 26, here within a tolerance of ± 0.050 millimeter. The angle α between axes 19, 25 is here 20°. Such angle α is bisected by an axis 28, such axis 28 being the normal to the plane of surface 26. Grooves 18, 20 are milled so that axis 28 bisects the angle α, here within a tolerance of two minutes of arc.

A hole 29 is drilled through a portion of block 14, normal to surface 16, along an axis 30, such axis 30 here being disposed 10 millimeters from the plane of surface 26 along axis 28, as shown. Here the diameter of such hole 29 is 5 millimeters. Another hole 31 (here also of 5 millimeter diameter) is drilled through a portion of block 14 along axis 32, such axis here being orthogonal to axis 30. The holes 29, 31 are oriented so that axes 32, 30 intersect at point 34. The hole 31 is counterbored as shown to a diameter, here 15 millimeters, to form a cavity 36. Inserted into cavity 36 is a conventional cup-shaped cathode electrode 38, here having a diameter of 14 millimeters. After insertion of cathode electrode 38 the cavity 36 is enclosed by affixing a suitable disk 40, here having a diameter 17 millimeters, to the block 14. Passing through disk 40 is a hollow copper conduit 42 for a helium-neon gas mixture in the cavity 36, via hole 41, after the gas discharge tube 10 is assembled and also for providing a suitable connection between a voltage source (not shown) and the cathode electrode 38.

Blocks 12, 14 are aligned so that anode electrodes 11, 13 are disposed over grooves 18, 20, respectively, when the surfaces 15, 16 are placed in contact with each other. Blocks 12, 14 then are effectively affixed to each other because of the optical contact between surfaces 15, 16. Grooves 18, 20 and the surface 15 thereby form a V-shaped capillary in the affixed blocks 12, 14. It is here noted, however, that while optical contact provides sufficient means for affixing blocks 12, 14 together, a suitable bracket arrangement (not shown) may be used to provide an additional fastening means for the blocks 12, 14. After blocks 12, 14 are fastened, laser windows 46, 48 here are fastened in any conventional manner, as with a suitable epoxy, to the blocks 12, 14 at the open ends of the V-shaped capillary, as shown. Here such windows 46, 48 are, for reasons to become apparent, focusing lenses, such lenses having a flat surface facing the blocks 12, 14. Also, a reflector, here a plane mirror 50, is affixed to such blocks 12, 14 adjacent the point of inflection of the V-shaped capillary, as shown. It is here noted that the reflecting surface of such mirror 50 is disposed, as shown, in the plane of surface 26 and the normal to such mirror is along axis 28. Having so assembled the laser discharge tube 10, the helium-neon gas mixture is introduced from a source (not shown) into cavity 36 by way of conduit 42 and hole 41. A portion of such gas mixture passes through the holes 29, 31 to fill the V-shaped capillary. The gas mixture is stored at a desired pressure, here about 2 Torr. After reaching such desired pressure conduit 42 is sealed closed and is disconnected from the gas mixture source. The mirror 50, windows 46, 48 and disk 40, inter alia, provide sufficient means for enclosing the capillary to thereby enable storage of the gas mixture at such desired pressure. On application of a voltage between the cathode electrode 38 and the anode electrodes 11, 13 an electrical discharge is produced through the gas mixture.

Figure 2:
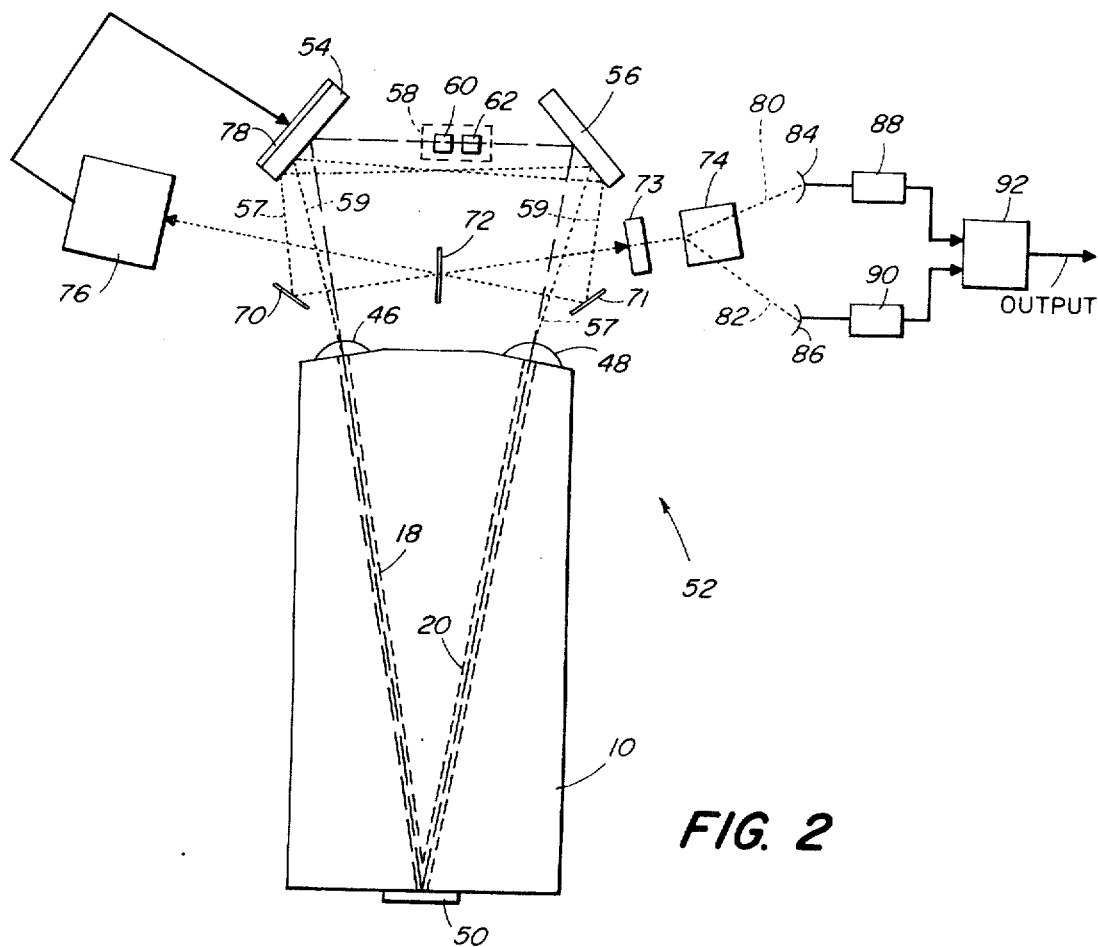
FIG. 2 is a plan view, somewhat simplified, of a laser gyroscope according to the invention, using the V-shaped laser discharge tube shown in FIG. 1.

Referring now to FIG. 2, a laser gyroscope 52 is shown assembled generally in accordance with my invention described in the above-referenced U.S. Pat. No. 3,741,657 and mounted to a suitable platform (not shown). Here such laser gyroscope 52 uses the laser discharge tube assembly 10 shown in FIG. 1 as a laser amplifier medium. A triangular shaped "ring" or closed path resonator for the laser beams is defined by reflectors 54, 56 in combination with mirror 50. The laser beams are in a common plane hereinafter sometimes referred to as the "plane of the laser."

Positioned in the base of the triangular shaped "ring" laser resonator is a polarization dispersive structure 58. Such structure here includes a conventional quartz half-wave retarder 60 and a conventional Faraday rotator 62. The laser beam passing from the discharge tube assembly 10 to reflector 56 (i.e., the counterclockwise traveling beam) is focused by the laser windows 46, 48 (here lenses) at the entrance to the capillary segment formed by groove 18. The clockwise traveling laser beam is focused by the laser windows 46, 48 (here lenses) at the entrance to the capillary segment formed by groove 20. The polarization dispersive structure 58 is disposed in the path of both the clockwise and counterclockwise traveling laser beams. As described in my referenced U.S. patent, both such clockwise and counterclockwise traveling laser beams contain oppositely sensed circularly polarized waves. The half-wave retarder 60 produces, in combination with an odd number of reflectors 50, 54, 56 (for reasons to be discussed hereinafter), a delay for circularly polarized waves that is different for one sense of circular polarization than for the opposite sense. Further, such half-wave retarder 60 is reciprocal, that is, the same delay will be produced for both the clockwise and counterclockwise traveling laser beams. The reason for the difference in delay for oppositely sensed circularly polarized waves may be explained by referring to FIG. 2A where a beam of circularly polarized wave is shown to pass through a pair of exemplary half-wave retarders 200, 202. Such half-wave retarders 200, 202 are assumed to be uniaxial crystals, here crystalline quartz. Each half-wave retarder 200, 202 is assumed to have a set of orthogonal crystallographic axes X, Y, Z and X', Y', Z', respectively, as shown. Here the X axis and the X' axis are codirectional with the beam and the Y axis and Y' axis are rotated with respect to each other, about the X and X' axes, through an angle γ (radians). The Z and Z' axes are commonly referred to as the optic-axes or the "distinguished direction" axes and the X, X' and Y, Y' axes are sometimes referred to as the "equivalent direction" axes as described in "Principles of Optics" by M. Born and E. Wolf, 4th Edition, 1970 Pergamon Press, New York, page 678. Let us represent the beam entering half-wave retarder 200 as:

$$\vec{R}_i = Ae^{i\pi/2} \vec{Y} + A\vec{Z}$$

The effect of half-wave retarder 200 is to retard the "Y" component of the entering beam one-half wavelength with respect to the "Z" component of such beam. Therefore, the beam exiting half-wave retarder 200 may be represented as $$\vec{R}_o = Ae^{a\pi/2} \vec{Y} + A\vec{Z}$$

It is first noted that the sense of circular polarization of such exiting beam is reversed (with respect to the entering beam) by the half-wave retarder 200. That is, if the beam entering half-wave retarder 200 is of right hand circular polarization, the beam exiting such retarder is of left hand circular polarization. Transforming $\vec{R}_o$ into the X', Y', Z' coordinate system associated with half-wave retarder 202, the beam entering half-wave retarder 202 may be represented as:

$\vec{R}_o = [Ae^{i\pi/2} \cos\gamma + A \sin\gamma] \vec{Y}' + [A \cos\gamma - A(\sin\gamma)e^{i\pi/2}] \vec{Z}' =$
$\quad [Ae^{i\pi/2} \cos\gamma + A \sin\gamma] \vec{Y}' + [A \cos\gamma + A(\sin\gamma) e^{i\pi/2}] \vec{Z}'$ The effect of half-wave retarder 202 on the beam is to retard the "Y'" component of such beam one-half wavelength with respect to the "Z'" component of such beam. Therefore, the beam exiting half-wave retarder 202 may be represented as:

$\vec{R}_o' = [Ae^{i\pi/2} \cos\gamma + Ae^{i\pi} \cos\gamma] \vec{Y}' + [A \cos\gamma$
$\quad + A(\sin\gamma) e^{i\pi/2}] \vec{Z}' = Ae^{i\pi/2} \cdot e^{i\gamma}\vec{Y}' + Ae^{i\gamma}\vec{Z}'$ It is noted that the sense of circular polarization has been reversed by the half-wave retarder 202. That is, if the beam entering the half-wave retarder 202 is of left hand circular polarization the beam exiting such retarder 202 is of right hand circular polarization. Or, expressing $\vec{R}_o'$ in the X, Y, Z coordinates:
$\vec{R}_o' = Ae^{i\pi/2} \cdot e^{2i\gamma}\vec{Y} + Ae^{2i\gamma}\vec{Z} = \vec{R}_i [e^{2i\gamma}]$ Therefore, the beam exiting half-wave retarder 202 has the same sense of polarization as the beam entering half-wave retarder 200. However, such exiting beam has a $2\gamma$ (radian) pathlength change from such entering beam. Using a beam entering half-wave retarder 200 which has an opposite sense of circular polarization from that in the discussion above, (i.e., one which may be represented as:
$\vec{L}_o = Ae^{-i\pi/2} \vec{Y} + A\vec{Z})$ it may be shown that such beam exits from half-wave retarder 202 with a $-2\gamma$ (radian) pathlength change with respect to the entering beam half-wave retarder 200. It follows that, if the beam entering half-wave retarder 200 has right hand circularly polarized waves and left hand circularly polarized waves and if such waves are "in phase" as they enter such half-wave retarder 200, then when they exit half-wave retarder 202 they are not in phase. It follows from the discussion above the phase difference will be $4\gamma$ radians.

Let us now replace one of the half-wave retarders, say half-wave retarder 200, with a reflector 204 as shown in FIG. 2B. Reflector 204 has the effect of reversing the sense of circular polarization of a beam incident thereon. That is, a reflected beam from the reflector 204 has an opposite sense of circular polarization from the sense of circular polarization of a beam incident thereon. It follows that if one of the "equivalent direction axes," say X', (FIG. 2A) is considered to be disposed in the plane defined by the beam incident on and the beam reflected by reflector 204, and if the Y' axis of such half-wave retarder 202 is considered to be at an angle $\gamma$ with respect to a normal to such plane, then the sense of circular polarization of the beam incident on reflector 204 is the same as the sense of circular polarization of the beam exiting half-wave retarder 202. Further, if the beam incident on reflector 204 has right hand circularly polarized waves and left hand circularly polarized waves and if such waves are "in phase" as they strike such reflector 204 such right hand circularly polarized waves and left hand circularly polarized waves have, when they exit half-wave retarder 202, a pathlength or phase difference of $4\gamma$ (radians).

Referring to FIG. 2C, a convenient means, 206, is shown for mounting and orienting the half-wave retarder 60. Such half-wave retarder 60 is held by metal ring 208 with the one of the "equivalent direction" crystallographic axis, say the X axis, of such retarder aligned codirectionally with the laser beams. Metal ring 208 is rotatably mounted within support 210 by means of bearing (not shown). Support 210 is mounted in any convenient manner to the platform (not shown) of the laser gyroscope. Metal ring 208 has a bevelled outer edge in the form of a bevelled gear. Such gear is meshed with a drive pinion gear 210 which may be rotated in any convenient manner within the support 210. Such rotation of drive pinion gear 212, in turn, causes the half-wave retarder to rotate its Y and Z crystallographic axes about its X crystallographic axis. Therefore, drive pinion gear 212 is rotated until the Y crystallographic axis is at a desired angle with respect to the plane of the laser. It is here noted that, because an odd number (i.e., 3) of reflectors (i.e., reflectors 50, 54, 56) are used to define the laser resonator and because each one of such reflectors causes a reversal in the sense of polarization of the circularly polarized waves in the beams being reflected thereby, the sense of polarization of the clockwise traveling beam (or in the counterclockwise traveling beam) will, absent the half-wave retarder 60, reverse for each revolution of each beam. Therefore, in addition to providing the desired aforementioned delay, the half-wave retarder 60 is included to provide a reversal in the sense of polarization of each beam passing therethrough, thereby maintaining the sense of the polarization of the circularly polarized waves in the beams at any point within the closed laser resonator. It is also noted, for reason discussed above, that the half-wave retarder 60 is disposed in the path of the laser beams with one of the "equivalent direction" crystallographic axes (say the X' axis) thereof disposed in the plane of the laser. The phase difference, or delay, between the right hand circularly polarized wave and the left hand circularly polarized wave of each one of the beams passing through such half-wave retarder 60 is proportional to $4\gamma$, where $\gamma$ is the angle between the other one of the "equivalent direction" crystallographic axes (say the Y' axis) of such retarder 60 and the normal to the plane of the laser path.

Faraday rotator 62 also delays the circularly polarized waves, but is nonreciprocal and produces different delays for the clockwise and counterclockwise traveling laser beams. As described in detail in my referenced U.S. patent, the clockwise traveling laser beam has a right hand circularly polarized wave with a frequency $f_{24}$ and a left hand circularly polarized wave with a frequency $f_{21}$ and the counterclockwise traveling laser beam has a right hand circularly polarized wave with a frequency $f_{23}$ and a left hand circularly polarized wave with a frequency $f_{22}$, where $f_{22} > f_{21}$; $f_{23} > f_{22}$; and $f_{24} > f_{23}$. Further, the frequencies $f_{21}$, $f_{22}$, $f_{23}$ and $f_{24}$ are positioned symmetrically about the center maximum gain frequency of the gain curve associated with the particular laser medium here used.

When the platform (not shown) is rotated about an axis orthogonal to the plane of the laser path, the frequencies $f_{21}$, $f_{22}$, $f_{23}$, $f_{24}$ shift, as described in my referenced U.S. patent, in accordance with the rate of such rotation.

A small portion (i.e., less than a tenth of a percent) of the clockwise traveling laser beam is reflected from the flat surface of window 48 back to reflector 56 (as shown by dotted line 57). Such portion of the beam is reflected then from reflector 56 successively to reflectors 54 and 70. A portion of the beam reflected by reflector 70 passes through a half-silvered mirror 72 to a quarter wave retarder 73 and a polarizer 74, here a Wollaston prism, and another portion of the beam is reflected by the half-silvered mirror 72, to a pathlength stabilizer 76, the details of which will be described in connection with FIG. 3. Suffice it to say here, however, that pathlength stabilizer 76 provides an electrical signal to a piezoelectric crystal 78 which is included in support structure (not otherwise shown) for reflector 54. The piezoelectric crystal 78 is responsive to such signal to produce movement of such reflector 54 and thereby compensate for mechanical motions of the system so that symmetry of frequencies $f_{21}, f_{22}, f_{23}, f_{24}$ about the center of maximum gain is maintained as described in my referenced U.S. patent.

Similarly, a small portion (i.e., less than one-tenth of . percent) of the counterclockwise traveling laser beam is reflected by the flat surface of window 46 (as indicated by dotted line 59) to pass through the quarter wave retarder 73 and polarizer 74 and pathlength stabilizer 76 by successive reflections from reflectors 54, 56, 71 and half-silvered mirror 72. It follows, then, that a portion of the clockwise and counterclockwise traveling beams are combined into a first composite beam passing to quarter wave retarder 73 and polarizer 74 and a second composite beam passing to pathlength stabilizer 76, each such beam containing both right hand circularly polarized waves and left hand circularly polarized waves. The quarter wave retarder 73 and polarizer 74 are constructed according to well known principles to spatially separate the circularly polarized beams passed thereto into two beams, 80, 82, beam 80 being a linearly polarized wave with frequency components $f_{23}, f_{24}$ and beam 82 being a linear polarized wave having an orientation orthogonal to the polarization of beam 80) with frequency components $f_{21}, f_{22}$. The beams 80, 82 are passed to photo-detectors 84, 86 as shown. The signal produced by photo-detector 84 has a frequency component $f_{23} - f_{24}$ and the signal produced by photodetector 86 has a frequency component $f_{21} - f_{22}$. The counters 88, 90 and adder 92 are included, as shown, to provide an output signal representative of the angular rate measured by the gyroscope as described in my referenced above U.S. patent.

Figure 3:
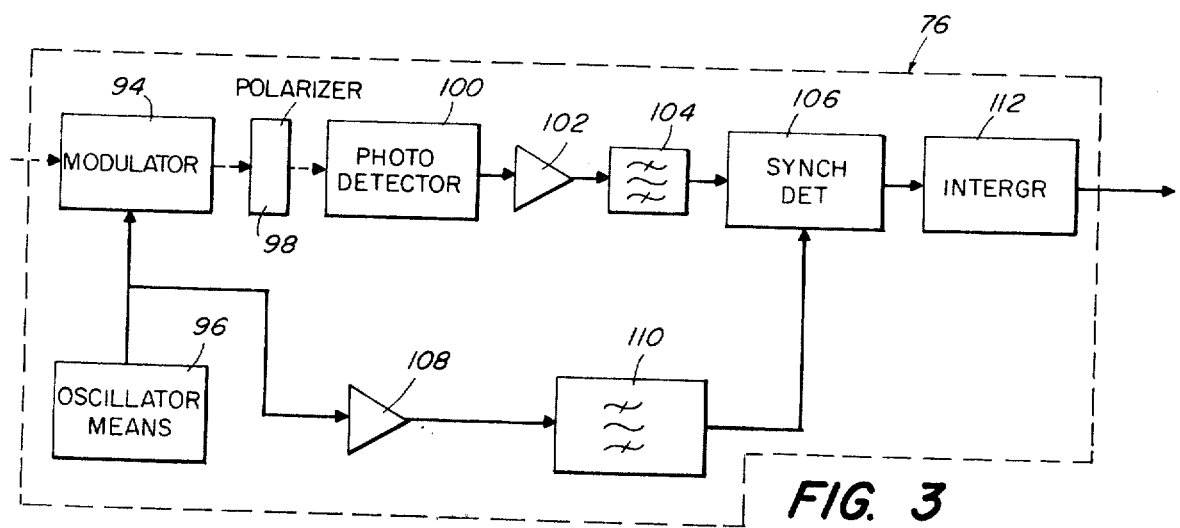
FIG. 3 is a schematic diagram of a pathlength stabilizer used in the laser gyroscope shown in FIG. 2.

Referring now to FIG. 3, the details of the pathlength stabilizer 76 are shown to include a modulator 94, here a conventional switchable quarter wave plate. Modulator 94 is responsive to a periodic voltage (having a fundamental frequency component $\Omega/2\pi$) from oscillator means 96. The periodic voltage causes the modulator 94 to switch between a first state and a second state within each period, thereby causing such modulator to act as either a "plus" quarter wave retardation plate or a "minut" quarter wave retardation plate, respectively. That is, when the modulator 94 is operated in the first state, the portion of the second composite beam made up of right hand circularly polarized waves will be converted by such modulator to, say, a vertically polarized wave and the portion of such beam made up of left hand circularly polarized waves will be converted by such modulator to a horizontally polarized wave. When the modulator 94 is operated in the second state, however, the portion of the second composite beam made up of right hand circularly polarized waves will be converted by such modulator to a horizontally polarized wave and the portion of such beam made up of left hand circularly polarized waves will be converted into a vertically polarized wave.

A polarizer 98 is oriented to pass therethrough only vertically polarized waves. Consequently, during operation of modulator 94 in the first state the right hand circularly polarized wave portions of the second composite beam directed to pathlength stabilizer 76 will pass through polarizer 98 to a photodetector 100. During operation of modulator 94 in the second state, only the left hand circularly polarized wave portions of such beam will pass to photodetector 100. Therefore, the signal produced at the output of photodetector 100 is, during operation of modulator 94 in the first state, representative of the average power in the right hand circularly polarized waves in the laser beam (i.e., frequencies $f_{23}, f_{24}$) and is, during operation of such modulator in the second state, representative of the average power in the left hand circularly polarized waves in such beam (i.e., frequency $f_{21}, f_{22}$). The output signal produced by photodetector 100 is passes to amplifier 102 and band-pass filter 104. The output of band-pass filter 104 is a substantially sinusoidal signal of the form [A sin $(\Omega t + \phi)$] where: $\Omega/2\pi$ is the fundamental frequency component of the signal produced by the photodetector 100; A is proportional to the difference between the average power in the right hand circularly polarized wave detected by photodetector 100 and the average power in the left hand circularly polarized wave detected by such photodetector; and, $\phi$ is the phase angle between such output signal and the signal produced by the oscillator means 96. Such phase angle $\phi$ will be either 0° or 180°, depending on the relative power of the right hand and left hand circularly polarized waves detected by photo-detector 100. The output of band-pass filter 104 is passed to a synchronous detector 106. The signal produced by oscillator means 96 is fed to an amplifier 108 and band-pass filter 110 to produce a reference signal for synchronous detector 106. It follows then that the signal produced at the output of synchronous detector 106 will include a D.C. signal, the level of such D.C. signal being proportional to the difference between the average power in the right hand circularly polarized waves and the average power in the left hand circularly polarized waves. The polarity of such D.C. signal is indicative of the relative power level between the right hand and left hand circularly polarized waves. Such D.C. signal is passed to an integrator 112. The output of such integrator 112 is fed to piezoelectric crystal 78 to complete a feedback control loop and thereby maintain the frequencies $f_{21}, f_{22}, f_{23}, f_{24}$ dispersed about the center of the maximum gain curve.

Figure 4:
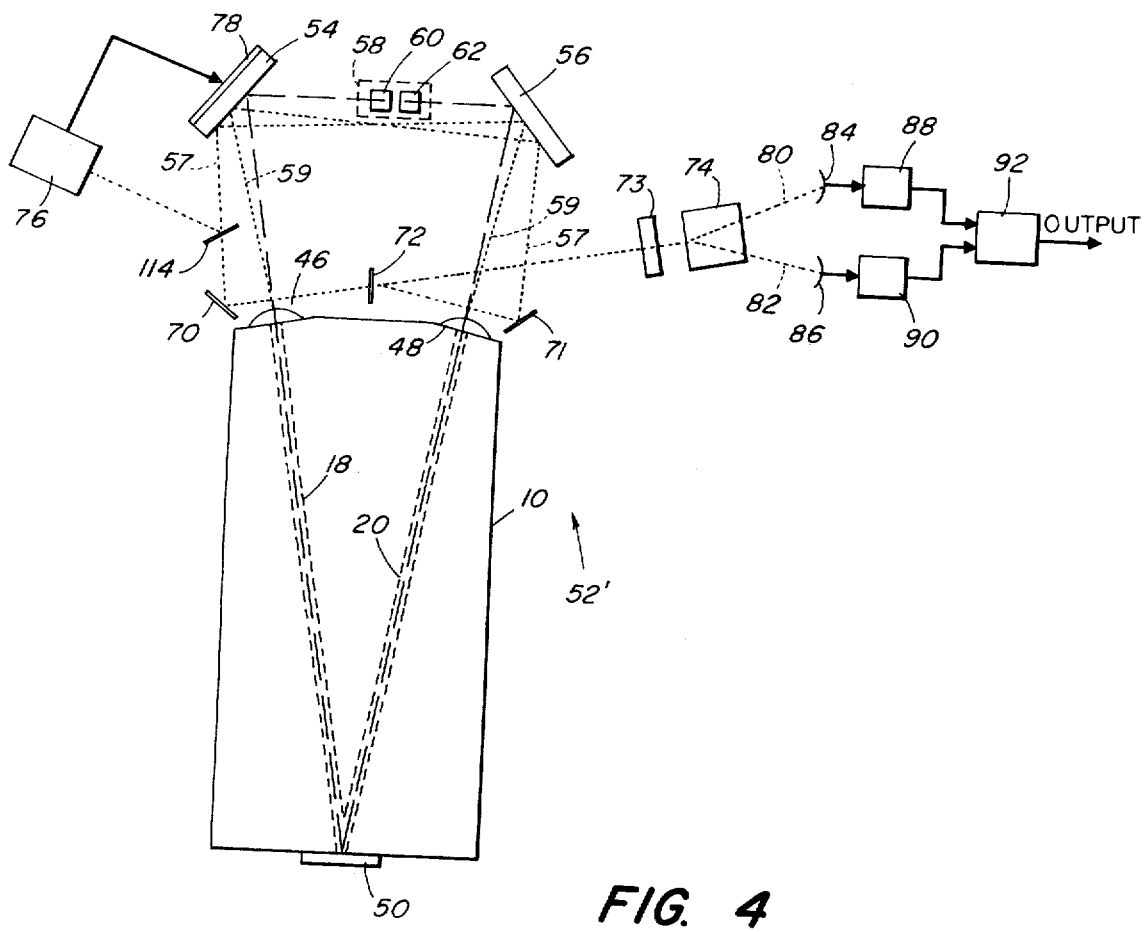
FIG. 4 is a plan view of an alternative embodiment of the gyroscope shown in FIG. 2.
Figure 5:
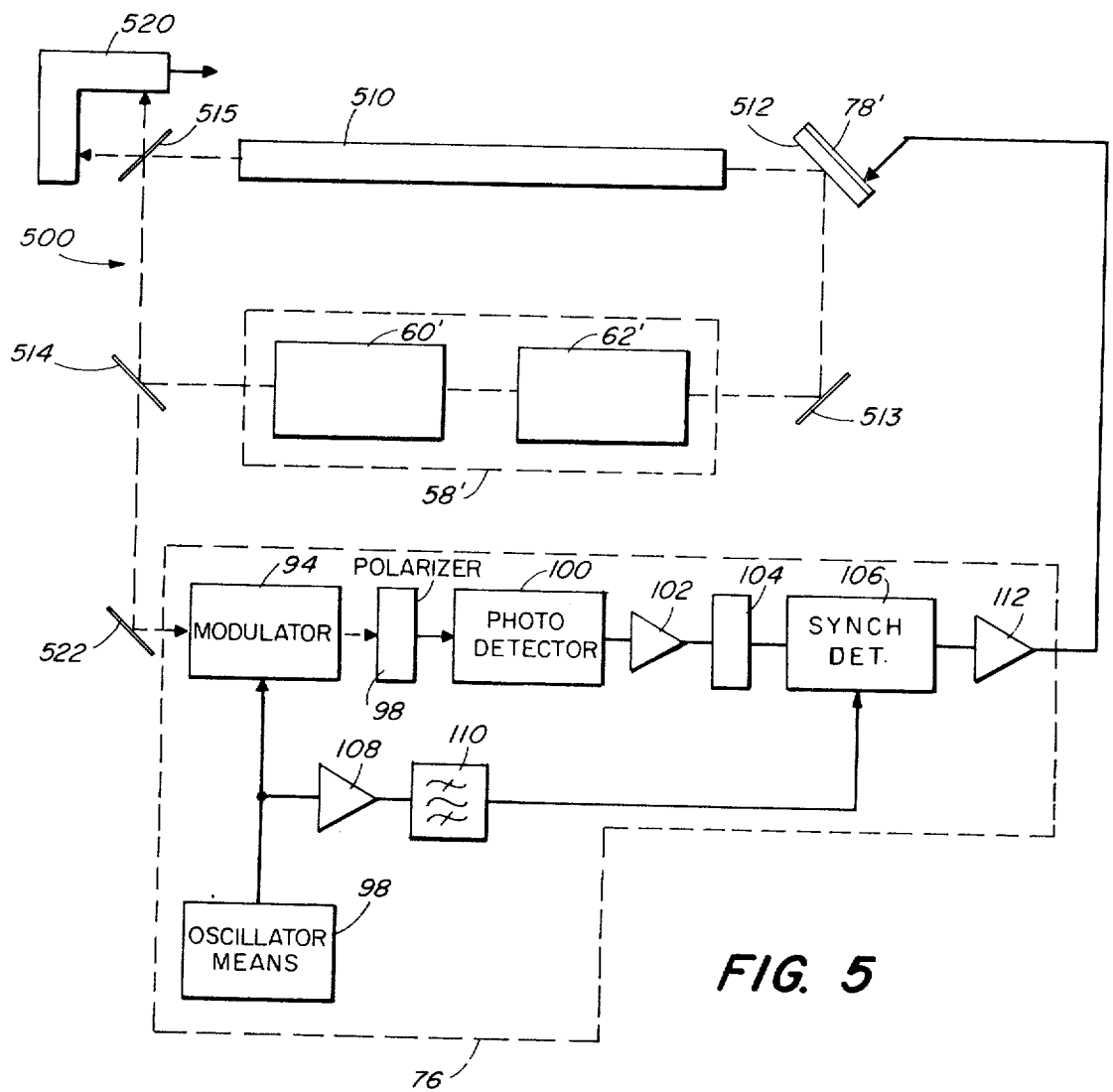

Referring now to FIG. 4, a laser gyroscope 52' is shown. Such gyroscope 52' is similar to that shown in FIG. 2 (all common elements having the same numbers) but here, however, a half silvered mirror 114 is disposed in the path of the portion of the clockwise traveling beam reflected by reflector 54. In such arrangement a portion of the clockwise traveling beam reflected by reflector 54 passes to reflector 70 and another portion of such reflected beam is passed to pathlength stabilizer 76. Therefore, pathlength stabilizer 76 responds to a single beam of energy having both right hand and left hand circularly polarized waves derived from the clockwise traveling laser beam. The half silvered mirror 114 and the pathlength stabilizer 76 are disposed so that no waves derived from the counterclockwise traveling laser beam may be passed to such stabilizer. It follows then that the resulting mechanical motion compensation is effective to change the pathlength of the laser resonator to maintain frequencies $f_{21}$ and $f_{24}$ centered about the center maximum gain frequency of the gain curve associated with the laser medium. Referring now to FIG. 5, a laser gyroscope 500 assembled generally in accordance with my U.S. patent referenced above is shown to include a laser amplifier medium 510. A ring path for the laser beam, here a rectangular resonator, is produced by four reflectors 512, 513, 514, 515, positioned as shown. Reflectors 514, 515 here are half-silvered mirrors. Here the laser path includes four (i.e., an even number) of reflectors and hence polarization dispersive structure 58' here includes a Faraday rotator 60' and a crystal rotator 62' as described in my referenced U.S. patent.

Light coupled as shown out of the rectangular resonator through half-silvered mirror 515 is used to actuate a processor 520. The latter includes quarter-wave plates, half silvered mirrors, polarization analyzers and photodetectors of any desired configuration such as, for example, those discussed in my referenced U.S. patent. When actuated the processor 510 provides information of the rate sensed by the gyroscope.

A portion of the counterclockwise traveling beam in the rectangular resonator is coupled to pathlength stabilizer 76 via half silvered mirror 514 and reflector 522. Such beam has a right hand circularly polarized wave of frequency $f_{23}'$ and a left hand circularly polarized wave of frequency $f_{22}'$. Path length stabilizer 76 produces a control signal for a piezoelectric crystal 78' on which reflector 512 is mounted, such control signal being representative of the difference in level between the right hand and left hand circularly polarized waves of the counterclockwise traveling beam. Hence, the path length of the laser resonator is adjusted by using a single photodetector to maintain the frequencies $f_{22}'$, $f_{23}'$ symmetrically disposed about the center maximum gain curve associated with the laser medium.

Referring now to FIG. 6, a laser gyroscope 500' is shown wherein path length stabilizer 76 responds to portions of both the clockwise and counterclockwise traveling beams. Here reflector 522' is a half silvered mirror. Reflectors 530, 532 are provided to combine the right hand and left hand circularly polarized waves of the clockwise traveling beam and the counterclockwise traveling beam into a single composite beam represented by dotted line 534. Hence, here the path length of the laser resonator is adjusted using a single photodetector and portions of the waves in both the clockwise and counterclockwise traveling beams to maintain the frequencies $f_{21}'$, $f_{22}'$, $f_{23}'$, $f_{24}'$ symmetrically positioned about the center maximum gain curve associated with the laser medium.

Having described the foregoing embodiments of this invention it is now evident to those of skill in the art that other embodiments incorporating its concepts may be used. For example, a W-shaped laser discharge tube assembly, as described in my copending patent application entitled "Laser Discharge Tube Assembly", Ser. No. 441,087, filed concurrently herewith and assigned to the same assignee as the present invention, may be used as the laser amplifier medium.

It is felt, therefore, that this invention should not be restricted to its disclosed embodiments but rather should be limited only by the spirit and scope of the appended claims.

What is claimed is:
1. In combination:
  a. a laser medium for providing amplification to radiant energy waves passing therethrough, the amplification of such medium being a function of the frequency of such waves and being maximum at a predetermined frequency;
  b. means for directing two pairs of radiant energy waves to pass through the laser medium in opposite directions, each one of the waves in the two pairs thereof having a separate frequency, said frequencies being symmetrically disposed about a predetermined frequency;
  c. means for combining a portion of each one of the radiant energy waves in at least one of the two pairs of waves passing through the laser medium into a single composite beam having two separate frequencies; and
  d. means, responsive to the relative energy level in each one of the waves in such composite beam, for maintaining the separate frequencies of the two pairs of waves passing through the laser medium symmetrically disposed about the predetermined frequency.

2. The combination recited in claim 1 wherein such composite beam includes waves of two senses of polarization, and such maintaining means includes means for comparing the energy level in the waves of one sense of polarization with the energy level in the waves of the other sense of polarization.

3. The combination recited in claim 2 wherein the comparing means includes:
  a. modulator means, disposed in the path of the composite beam, for passing during one time interval the energy in the waves of one sense of polarization and during a second time interval the energy in the waves of the other sense of polarization; and
  b. means, responsive to the energy passed by the modulator means, for detecting the energy level in such passed waves.

4. The combination recited in claim 1 wherein the combining means includes means for combining a portion of each one of the waves in the pair of waves into a single composite beam.

5. The combination recited in claim 4 wherein such composite beam includes waves of two senses of polarization, and such maintaining means includes means for comparing the energy level in the waves of one sense of polarization with the energy level in the waves of the other sense of polarization.

6. The combination recited in claim 5 wherein the comparing means includes:
  a. modulator means, disposed in the path of the composite beam, for passing during one time interval the energy in the waves of one sense of polarization and during a second time interval the energy in the waves of the other sense of polarization; and
  b. means, responsive to the energy passed by the modulator means, for detecting the energy level in such passed waves.

7. In combination:
  a. a laser medium for providing amplification to a plurality of oppositely polarized radiant energy waves passing therethrough;
  b. ring resonator means for directing the plurality of oppositely polarized radiant energy waves to pass through the laser medium, such waves having different frequencies;
  c. means for combining a portion of at least two of the waves into a single composite beam; and,
  d. means, responsive to the relative energy level in each one of the waves in the composite beam, for maintaining the different frequencies of the waves in such composite beam symmetrically disposed about the predetermined frequency.

* * * * *